(12) United States Patent
Dudley et al.

(10) Patent No.: US 6,780,904 B2
(45) Date of Patent: Aug. 24, 2004

(54) TIRE SEALER AND INFLATOR

(75) Inventors: N. Howard Dudley, Blum, TX (US); Michael L. Schwartz, Cleburne, TX (US); Richard L. Miller, Cleburne, TX (US)

(73) Assignee: Technical Chemical Company, Cleburne, TX (US)

( * ) Notice: Subject to any disclaimer, the term of this patent is extended or adjusted under 35 U.S.C. 154(b) by 0 days.

(21) Appl. No.: 10/265,800

(22) Filed: Oct. 7, 2002

(65) Prior Publication Data

US 2004/0068033 A1 Apr. 8, 2004

(51) Int. Cl.[7] .............................. C08J 3/03; C08K 5/02; C08L 27/12
(52) U.S. Cl. ..................... 524/96; 524/247; 524/320; 524/379; 524/389; 524/394; 524/428; 524/429; 524/501
(58) Field of Search .......................... 524/96, 247, 320, 524/379, 389, 394, 428, 429, 501

(56) References Cited

U.S. PATENT DOCUMENTS

| 5,124,395 A | | 6/1992 | Abramowski et al. | |
| 5,648,406 A | * | 7/1997 | Peelor et al. | ................ 523/166 |

* cited by examiner

*Primary Examiner*—Kriellion A. Sanders
(74) *Attorney, Agent, or Firm*—Konneker & Smith, P.C.

(57) ABSTRACT

A tire sealer and inflator provides utilization of R-134a propellant combined with a sealant composition. In a described example, a tire sealer and inflator includes R-134a propellant, and a sealant composition consisting essentially of, by weight, water approximately 77%, acrylic resin emulsion approximately 22%, sodium nitrite approximately 0.75%, oleic acid approximately 0.01%, and ammonium hydroxide approximately 0.01%.

60 Claims, No Drawings

TIRE SEALER AND INFLATOR

BACKGROUND

The present invention relates generally to aerosol compositions and, in an embodiment described herein, more particularly provides a tire sealer and inflator.

It has become increasingly desirable to modify aerosol compositions so that they are nonflammable, and so that they have a reduced potential for harm to the earth's ozone layer. In the art of producing tire sealer and inflator products, the propellant known as R-134a has been substituted for prior potentially flammable and/or more ozone depleting propellants. However, these attempts at the use of R-134a have not been entirely satisfactory.

For example, prior attempts at the use of R-134a in tire sealers and inflators have utilized vapor pressure depressants in a tire sealant composition to reduce the vapor pressure of the R-134a in the composition. If this use of vapor pressure depressants in the composition could be eliminated, production of the tire sealant composition could be more efficient, and compensation for the addition of the vapor pressure depressant would not have to be made in the composition.

Prior attempts at the use of R-134a in tire sealers and inflators have utilized sealers which were compatible with the specific tire sealant composition. These sealers were, for example, latex, vinyl acetate and polyvinyl acetate. A more desirable sealer may be used if a different composition for a tire sealer and inflator utilizing R-134a is available.

From the foregoing, it can be seen that it would be quite desirable to provide a new tire sealer and inflator which uses R-134a as a propellant, and which utilizes a new sealant composition. In addition, it would be beneficial to provide a new sealant composition which does not require the use of a vapor pressure depressant. Further, it would be beneficial to provide a new sealant composition which permits use of alternate sealers.

SUMMARY

In carrying out the principles of the present invention, in accordance with an embodiment thereof, a tire sealer and inflator is provided which reduces or eliminates the above problems in the art. The new tire sealer and inflator advances the art by permitting the use of R-134a propellant with a new, more desirable, sealant composition.

In one aspect of the invention, a tire sealer and inflator is provided which includes R-134a propellant, and a sealant composition consisting essentially of, by weight, water approximately 77%, acrylic resin emulsion approximately 22%, sodium nitrite approximately 0.75%, oleic acid approximately 0.01%, and ammonium hydroxide approximately 0.01%.

In another aspect of the invention, a tire sealer and inflator is provided which includes R-134a propellant and a sealant composition free of any vapor pressure depressant. The tire sealer and inflator includes no glycol, glycol ether, alkyl acetate or 2-butoxyethanol.

In yet another aspect of the invention, a tire sealer and inflator is provided which includes R-134a propellant, and a sealant composition including a sealer. The sealer is preferably an acrylic resin emulsion, instead of a latex, polyvinyl acetate or vinyl acetate sealer.

In a further aspect of the invention, a tire sealer and inflator is provided which includes R-134a propellant and a sealant composition, and wherein the tire sealer and inflator has a vapor pressure at 130° F. of greater than 180 psig. Preferably, 111 grams of the R-134a propellant and 258 grams of the sealant composition are combined in an aerosol can.

These and other features, advantages, benefits and objects of the present invention will become apparent to one of ordinary skill in the art upon careful consideration of the detailed description of a representative embodiment of the invention hereinbelow.

DETAILED DESCRIPTION

The present inventors have invented a new tire sealer and inflator which is illustrated by the following example.

EXAMPLE

The tire sealer and inflator was prepared by combining a sealant composition with R-134a propellant in an aerosol can. The sealant composition was prepared according to the following formula, by weight:

| | |
|---|---|
| Water | 77.29% |
| Acrylic Resin Emulsion | 21.94% |
| Sodium Nitrite | 0.75% |
| Oleic Acid | 0.01% |
| Ammonium Hydroxide | 0.01% |

Four aerosol cans were prepared with each can containing 258 grams of the above sealant composition combined with 111 grams of R-134a propellant. The aerosol cans used were 211 X 604 AD44 dome aerosol cans available from Sexton Can Company, Inc. of Decatur, Ala.

The cans were then immersed in a 130° F. hot water bath for a minimum of four minutes. With the can remaining in the water bath, the pressure of each can was recorded by using a calibrated pressure gauge modified with an adapter to fit a valve stem of the aerosol can. The vapor pressures of the cans were recorded as follows:

| | |
|---|---|
| Can 1 | 190 psig |
| Can 2 | 190 psig |
| Can 3 | 186 psig |
| Can 4 | 188 psig |

The above vapor pressures are sufficient for the tire sealer and inflator when used in the cans tested to acceptably inflate a normal passenger vehicle tire with enough pressure to permit driving on the tire. Note that the above sealant composition does not include a vapor pressure depressant, such as alkyl acetate, glycol, glycol ether or 2-butoxyethanol, which would reduce the ability of the tire sealer and inflator to inflate a normal passenger vehicle tire, and which would add to the cost of the composition. The above sealant composition has an acceptable pH and includes the ammonium hydroxide corrosion inhibitor for use in the aerosol can, and for eventual use in a tire.

Sodium nitrite and oleic acid are also corrosion inhibitors which may be used in the composition. Other acceptable corrosion inhibitors which may be used in the composition are morpholine, monoethanolamine and alkanolamine. Preferably, all corrosion inhibitors make up less than 2% of the sealant composition.

Note that the above sealant composition also permits the use of an acrylic resin emulsion sealer, instead of latex, vinyl acetate or a polyvinyl acetate emulsion.

It is expected that the sealant composition will produce satisfactory results when its constituents are used in the following acceptable ranges:

| | |
|---|---|
| Water | 49.0–85.0% |
| Acrylic Resin Emulsion | 15.0–50.0% |
| Sodium Nitrite | 0.2–8.0% |
| Oleic Acid | 0.005–8.0% |
| Ammonium Hydroxide | 0.005–8.0% |

A freezing point depressant is preferably added to the composition to prevent the water in the composition from freezing in cold climates. In addition, the R-134a propellant could further chill the composition as it expands in an aerosol valve when being dispensed from the aerosol can.

The freezing point depressant preferably comprises one or more alcohols and/or salts of acetic acid. Of these, the most preferred presently are methanol, ethanol and isopropyl alcohol. Potassium acetate and sodium acetate may also be used. Preferably, the freezing point depressant is in the range of from 0% to approximately 20% of the sealant composition.

Of course, a person skilled in the art would, upon a careful consideration of the above description of representative embodiments of the invention, readily appreciate that many modifications, additions, substitutions, deletions, and other changes may be made to these specific embodiments, and such changes are contemplated by the principles of the present invention. Accordingly, the foregoing detailed description is to be clearly understood as being given by way of illustration and example only, the spirit and scope of the present invention being limited solely by the appended claims and their equivalents.

What is claimed is:

1. A tire sealer and inflator, comprising:
   R-134a 1, 1, 1, 2-tetrafluoroethane propellant; and
   a sealant composition consisting essentially of, by weight:
      water approximately 77%;
      acrylic resin emulsion approximately 22%; and
      a corrosion inhibitor approximately 1%.
2. The tire sealer and inflator according to claim 1, further comprising approximately 111 grams of the R-134a 1, 1, 1, 2-tetrafluoroethane propellant combined with approximately 258 grams of the sealant composition in an aerosol can.
3. The tire sealer and inflator according to claim 1, wherein the tire sealer and inflator has a vapor pressure at 130° F. of greater than 180 psig.
4. The tire sealer and inflator according to claim 1, wherein the sealant composition includes no vapor pressure depressant.
5. The tire sealer and inflator according to claim 1, wherein the sealant composition is free of any glycol vapor depressant.
6. The tire sealer and inflator according to claim 1, wherein the sealant composition is free of any glycol ether vapor depressant.
7. The tire sealer and inflator according to claim 1, wherein the sealant composition is free of any alkyl acetate vapor depressant.
8. The tire sealer and inflator according to claim 1, wherein the sealant composition is free of any 2-butoxyethanol vapor depressant.
9. The tire sealer and inflator according to claim 1, wherein the sealant composition is free of any polyvinyl acetate sealer.
10. The tire sealer and inflator according to claim 1, wherein the sealant composition is free of any vinyl acetate sealer.
11. The tire sealer and inflator according to claim 1, wherein the sealant composition is free of any latex sealer.
12. The tire sealer and inflator according to claim 1, further comprising a freezing point depressant.
13. The tire sealer and inflator according to claim 12, wherein the freezing point depressant is an alcohol.
14. The tire sealer and inflator according to claim 13, wherein the freezing point depressant is a selected one or more of methanol, ethanol and isopropyl alcohol.
15. The tire sealer and inflator according to claim 12, wherein the freezing point depressant is a salt of acetic acid.
16. The tire sealer and inflator according to claim 15, wherein the freezing point depressant is selected from one or more of sodium acetate and potassium acetate.
17. The tire sealer and inflator according to claim 1, wherein the corrosion inhibitor is selected from one or more of sodium nitrite, oleic acid, ammonium hydroxide, morpholine, monoethanolamine and alkanolamine.
18. The tire sealer and inflator according to claim 1, wherein the corrosion inhibitor comprises:
   sodium nitrite approximately 0.75%;
   oleic acid approximately 0,01%; and
   ammonium hydroxide approximately 0.01%.
19. A tire sealer and inflator, comprising:
   R-134a 1, 1, 1, 2-tetrafluoroethane propellant; and
   a sealant composition free of any vapor pressure depressant.
20. The tire sealer and inflator according to claim 19, wherein the tire sealer and inflator has a vapor pressure at 130° F. of greater than 180 psig.
21. The tire sealer and inflator according to claim 19, wherein 111 grams of the R-134a 1, 1, 1, 2-tetrafluoroethane propellant is combined with 258 grams of the sealant composition in an aerosol can, the tire sealer and inflator having a vapor pressure at 130° F. of greater than 180 psig in the aerosol can.
22. The tire sealer and inflator according to claim 19, wherein the sealant composition includes approximately 15–50% acrylic resin emulsion by weight.
23. The tire sealer and inflator according to claim 19, wherein the sealant composition includes approximately 22% acrylic resin emulsion by weight.
24. The tire sealer and inflator according to claim 19, wherein the sealant composition is free of any glycol.
25. The tire sealer and inflator according to claim 19, wherein the sealant composition is free of any glycol ether.
26. The tire sealer and inflator according to claim 19, wherein the sealant composition is free of any alkyl acetate.
27. The tire sealer and inflator according to claim 19, wherein the sealant composition is free of any 2-butoxyethanol.
28. The tire sealer and inflator according to claim 19, wherein the sealant composition is free of any polyvinyl acetate sealer.
29. The tire sealer and inflator according to claim 19, wherein the sealant composition is free of any vinyl acetate sealer.
30. The tire sealer and inflator according to claim 19, wherein the sealant composition is free of any latex sealer.
31. The tire sealer and inflator according to claim 19, wherein the sealant composition includes a corrosion inhibitor.
32. The tire sealer and inflator according to claim 31, wherein the corrosion inhibitor is less than approximately 2% of the sealant composition.

33. The tire sealer and inflator according to claim 31, wherein the corrosion inhibitor is a selected one or more of sodium nitrite, oleic acid, ammonium hydroxide, morpholine, monoethanolamine and alkanolamine.

34. The tire sealer and inflator according to claim 31, wherein the corrosion inhibitor comprises:

sodium nitrite approximately 0.75%;

oleic acid approximately 0.01%; and ammonium hydroxide approximately 0.01%.

35. The tire sealer and inflator according to claim 19, wherein the sealant composition includes a freezing point depressant.

36. The tire sealer and inflator according to claim 35, wherein the freezing point depressant is an alcohol.

37. The tire sealer and inflator according to claim 36, wherein the freezing point depressant is a selected one or more of methanol, ethanol and isopropyl alcohol.

38. The tire sealer and inflator according to claim 35, wherein the freezing point depressant is a salt of acetic acid.

39. The tire sealer and inflator according to claim 38, wherein the freezing point depressant is a selected one or more of sodium acetate and potassium acetate.

40. The tire sealer and inflator according to claim 35, wherein the freezing point depressant is up to approximately 20% of the sealant composition.

41. A tire sealer and inflator, comprising:

R-134a 1, 1, 1, 2-tetrafluoroethane propellant; and a sealant composition, and wherein the tire sealer and inflator has a vapor pressure at 130° F. of greater than 180 psig.

42. The tire sealer and inflator according to claim 41, wherein approximately 111 grams of the R-134a 1, 1, 1, 2-tetrafluoroethane propellant is combined with approximately 258 grams of the sealant composition in an aerosol can.

43. The tire sealer and inflator according to claim 41, wherein the sealant composition includes no vapor pressure depressant.

44. The tire sealer and inflator according to claim 41, wherein the sealant composition is free of any glycol vapor depressant.

45. The tire sealer and inflator according to claim 41, wherein the sealant composition is free of any glycol ether vapor depressant.

46. The tire sealer and inflator according to claim 41, wherein the sealant composition is free of any alkyl acetate vapor depressant.

47. The tire sealer and inflator according to claim 41, wherein the sealant composition is free of any 2-butoxyethanol vapor depressant.

48. The tire sealer and inflator according to claim 41, wherein the sealant composition is free of any polyvinyl acetate sealer.

49. The tire sealer and inflator according to claim 41, wherein the sealant composition is free of any vinyl acetate sealer.

50. The tire sealer and inflator according to claim 41, wherein the sealant composition is free of any latex sealer.

51. The tire sealer and inflator according to claim 41, wherein the sealant composition includes a corrosion inhibitor.

52. The tire sealer and inflator according to claim 51, wherein the corrosion inhibitor is less than approximately 2% of the sealant composition.

53. The tire sealer and inflator according to claim 51, wherein the corrosion inhibitor is a selected one or more of sodium nitrite, oleic acid, ammonium hydroxide, morpholine, monoethanolamine and alkanolamine.

54. The tire sealer and inflator according to claim 51, wherein the corrosion inhibitor comprises:

sodium nitrite approximately 0.75%;

oleic acid approximately 0.01%; and ammonium hydroxide approximately 0.01%.

55. The tire sealer and inflator according to claim 41, wherein the sealant composition includes a freezing point depressant.

56. The tire sealer and inflator according to claim 55, wherein the freezing point depressant is an alcohol.

57. The tire sealer and inflator according to claim 56, wherein the freezing point depressant is a selected one or more of methanol, ethanol and isopropyl alcohol.

58. The tire sealer and inflator according to claim 55, wherein the freezing point depressant is a salt of acetic acid.

59. The tire sealer and inflator according to claim 58, wherein the freezing point depressant is a selected one or more of sodium acetate and potassium acetate.

60. The tire sealer and inflator according to claim 55, wherein the freezing point depressant is up to approximately 20% of the sealant composition.

* * * * *